United States Patent [19]
Ohl

[11] Patent Number: 5,947,428
[45] Date of Patent: Sep. 7, 1999

[54] INTERCHANGEABLE CLAMP, ACCESSORY AND SUPPORT SYSTEM

[76] Inventor: Larry R. Ohl, P.O. Box 496, Roundup, Mont. 59072

[21] Appl. No.: 08/738,683

[22] Filed: Oct. 28, 1996

[51] Int. Cl.⁶ ..................................................... B68G 5/00
[52] U.S. Cl. ........................................ 248/118; 248/229.1
[58] Field of Search ................................ 248/118, 118.3, 248/118.1, 229.1, 298.1, 200, 279.1, 283.1, 286.1; 297/411.23, 411.36, 411.1

[56] References Cited

U.S. PATENT DOCUMENTS

| | | |
|---|---|---|
| 2,266,231 | 12/1941 | Mazzeo et al. . |
| 4,177,967 | 12/1979 | Marchus ................................ 248/229.1 |
| 4,617,919 | 10/1986 | Suhre . |
| 4,726,363 | 2/1988 | Hergenroeder . |
| 4,742,981 | 5/1988 | Converse . |
| 4,832,299 | 5/1989 | Gorton et al. . |
| 4,913,393 | 4/1990 | Wood ................................... 297/411.23 |
| 4,971,393 | 11/1990 | Maisenhalder ......................... 248/118 |
| 5,362,021 | 11/1994 | Phillips . |
| 5,405,109 | 4/1995 | Nordnes . |
| 5,480,212 | 1/1996 | Marconet . |

FOREIGN PATENT DOCUMENTS

| | | |
|---|---|---|
| 1064535 | 5/1954 | France . |
| 40 22 836 | 1/1992 | Germany . |
| 89/10103 | 11/1989 | WIPO . |

*Primary Examiner*—Ramon O. Ramirez
*Assistant Examiner*—Willie Berry, Jr.
*Attorney, Agent, or Firm*—Richard C. Littman

[57] ABSTRACT

A clamping system of universally interchangeable clamping components and accessories for use with standard healthcare equipment or patient healthcare procedures. The clamping system includes a support rod, a slip-coupling and a mounting bracket from which depends a short perpendicular post, which bracket may be permanently affixed to any piece of furniture. The slip-coupling is a tubular body defining a receiving bore for close passage of the perpendicular post at a first end, and a through bore passing at a right angle to the receiving bore at the opposite end. A set screw is removably threaded through the tubular body and attached to an oversized knob head for easy manual rotation to tighten and release the set screw. The support rod passes through the through bore and from which other slip-couplings or a secondary slip-coupling are mounted. The rod is vertically oriented relative to the appliance to provide support for horizontally mounted secondary slip-couplings from which accessories depend, such as a removable tray, an arm rest, an elbow rest, a handle bar and veterinary limb clamp. A slotted bar serves as a horizontal appendage to which a secondary slip-coupling is attached to hold an I.V. pole.

17 Claims, 7 Drawing Sheets

INTERCHANGEABLE CLAMP, ACCESSORY AND SUPPORT SYSTEM

BACKGROUND OF THE INVENTION

1. Field of the Invention

The present invention relates to a clamping system, more particularly, an assemblage of universally interchangeable clamping components and accessories for use with standard healthcare equipment or patient healthcare procedures.

2. Description of the Prior Art

A plethora of devices are known in the medical arts which employ three-dimensionally adjustable mechanisms to better serve specialized functions. Most frequently, fixed stands are provided for the convenience of a medical practitioner, which stands somehow limit the desired motion of a patient. For example, U.S. Pat. No. 2,266,231 issued Dec. 16, 1941 to Mazzeo et al. describes an armrest for intravenous injections wherein the armrest acts as a stationary rest for a patient's arm to which a support stand for attachment of infusion apparatus is mounted. U.S. Pat. No. 4,726,363 issued Feb. 23, 1988 to Hergenroeder describes an adjustable stand with interchangeable limb-positioning attachments depending from a fixed base for maintaining an extremity in an optimal, fixed position during the application of an orthopedic cast. German Offenlegungschrift No. 40 22 836 published Jan. 23, 1992 describes an appliance having adjustable stops for rigidly holding a patient's arm during a radiological exam, and WIPO Publication No. 89/10103 published Nov. 2, 1989 shows a limb supporting device having a fork-like member for immobilizing with traction a patient's arm or leg during arthroscopic surgery. A less limiting support for a forearm adapted for use in the workplace is shown in U.S. Pat. No. 5,405,109 issued Apr. 11, 1995 to Nordnes, which support is used in a seated position and attaches to a table to help minimize the occurrence of occupational diseases.

Other inventions have focused on the need to conveniently support various equipment, most relevantly when used in treatment of an individual. In U.S. Pat. No. 4,742,981 issued May 10, 1988 to Converse, a surgical support assembly intended to eliminate the need for multiple, dedicated, roll-around stands or supports in an otherwise already crowded operating room is described. The assembly includes a telescoping support bar terminating in identical clamp means at each end for attachment to a pair of conventional I.V. poles so that a surgery tray may be supported across a surgical table. Another multi-adjustable surgical table having a generally U-shaped frame for attachment to the surgical table by a pair of bed rail clamps is described in U.S. Pat. No. 5,362,021 issued Nov. 8, 1994 to Phillips. In U.S. Pat. No. 4,832,299 issued May 23, 1989 to Gorton et al., a bracket-like clamp designed to hold infusion instrumentation associated with an I.V. pole is shown. U.S. Pat. No. 5,480,212 issued Jan. 2, 1996 to Marconet describes a medical instrument stand with an adjustable microscope mounting arm. Brevet D'Invention No. 1,064,535 published May 14, 1954 describes a stand for holding industrial equipment in place.

However most notably, U.S. Pat. No. 4,617,919 issued Oct. 21, 1986 to Suhre describes a plurality of posture supports in combination with a wheelchair, each support being three dimensionally adjustable by means of set screw couplers. A mounting coupler, affixed to the wheelchair, has a hole through which a support rod passes to in turn accommodate a series of slip couplers which allow dimensional movement along the longitudinal axis of the rod and rotatably about the rod near the head of the wheel chair. Posture supports having variously bent rods are then attached to the slip couplers, which pass through the couplers to selectively complete the three dimensional orientation desired. The Suhre patent is specifically directed at adjustably mounting posture pads for therapeutically supporting the neck, shoulders, trunk and thighs of a seated individual and fails to teach the purposes and features of the present invention.

None of the above inventions and patents, taken either singly or in combination, is seen to describe the instant invention as claimed.

SUMMARY OF THE INVENTION

The present invention relates to a clamping system, more particularly, an assemblage of universally interchangeable clamping components and accessories for use with standard healthcare equipment or patient healthcare procedures. In order to minimize clutter and possible accidents which result from the variety and large number of appliances commonly found in hospital rooms and other healthcare facilities, such as dedicated trays, poles, stands, braces, and the like, the present invention provides a mounting bracket from which depends a short perpendicular post, which bracket may be permanently affixed to any necessary piece of furniture present in the room of a patient, such as a chair, bed or wheelchair. By itself, the bracket is minimally noticeable and does not interfere with regular use of the object on which it is mounted. An alternative bracket for attachment to a wheelchair or other appliance having a cylindrical component is also provided. All other accessories depend from the universal mounting bracket.

The slip-coupling is a tubular body defining a receiving bore for close passage of the perpendicular post at a first end, and a through bore passing at a right angle to the receiving bore at the opposite end. Both the receiving bore and through bore lay in the same plane, allowing the slip coupling to have a trim, streamlined, elongated appearance which minimizes the difficulty of disinfecting the slip-couplings. The slip coupling is mounted on the post by passing the receiving bore over the post and tightening a set screw against the post to prevent rotational motion of the slip coupling. The set screw is removably threaded through the tubular body and attached to an oversized knob head for easy manual rotation to tighten and release the set screw.

A support rod is provided which passes through the through bore and from which other slip-couplings or a secondary slip-coupling can be mounted. The rod is vertically oriented relative to the appliance to which it is mounted to provide horizontally mounted secondary slip-couplings from which support accessories depend, such as a removable tray, an arm rest, an elbow rest, a handle bar and a veterinary limb clamp. The secondary slip-coupling is essentially a slip-coupling having a shank from which the receiving bore for the post has been eliminated and, instead, a threaded bore for receiving a mating screw has been substituted. To mount the secondary slip-coupling to the support rod, the secondary slip-coupling has a through passage and set screw passing through the shank. Thus, each support accessory can be provided with a mounting means having an aperture through which a screw is passed for directly and more permanently attaching the support accessory to the secondary slip-coupling, and be mounted onto the support rod by means of the through passage and associated set screw.

For adding vertical support accessories, such as an I.V. pole, a bar defining a slot along its length is provided whereby the set screws of a slip-coupling may be passed through the slot at any one of an infinitely variable number of points along the slot, and by tightening the set screw, the bar becomes secured between the knob heads and the tubular body of a slip-coupling. The bar serves as a horizontal appendage to which a secondary slip-coupling is then attached in the same manner, allowing an I.V. pole to be passed through its through passage.

Accordingly, it is a principal object of the invention to provide a clamping system for use with multiple accessories eliminating the need for dedicated stands for each accessory.

It is another object of the invention to provide a slip-coupling and mounting bracket for convenient attachment and removal of a support rod.

It is a further object of the invention to provide various accessories for mounting on the support rod useful in the healthcare industry.

Still another object of the invention is to provide a clamping system which is streamlined for ease of disinfecting.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
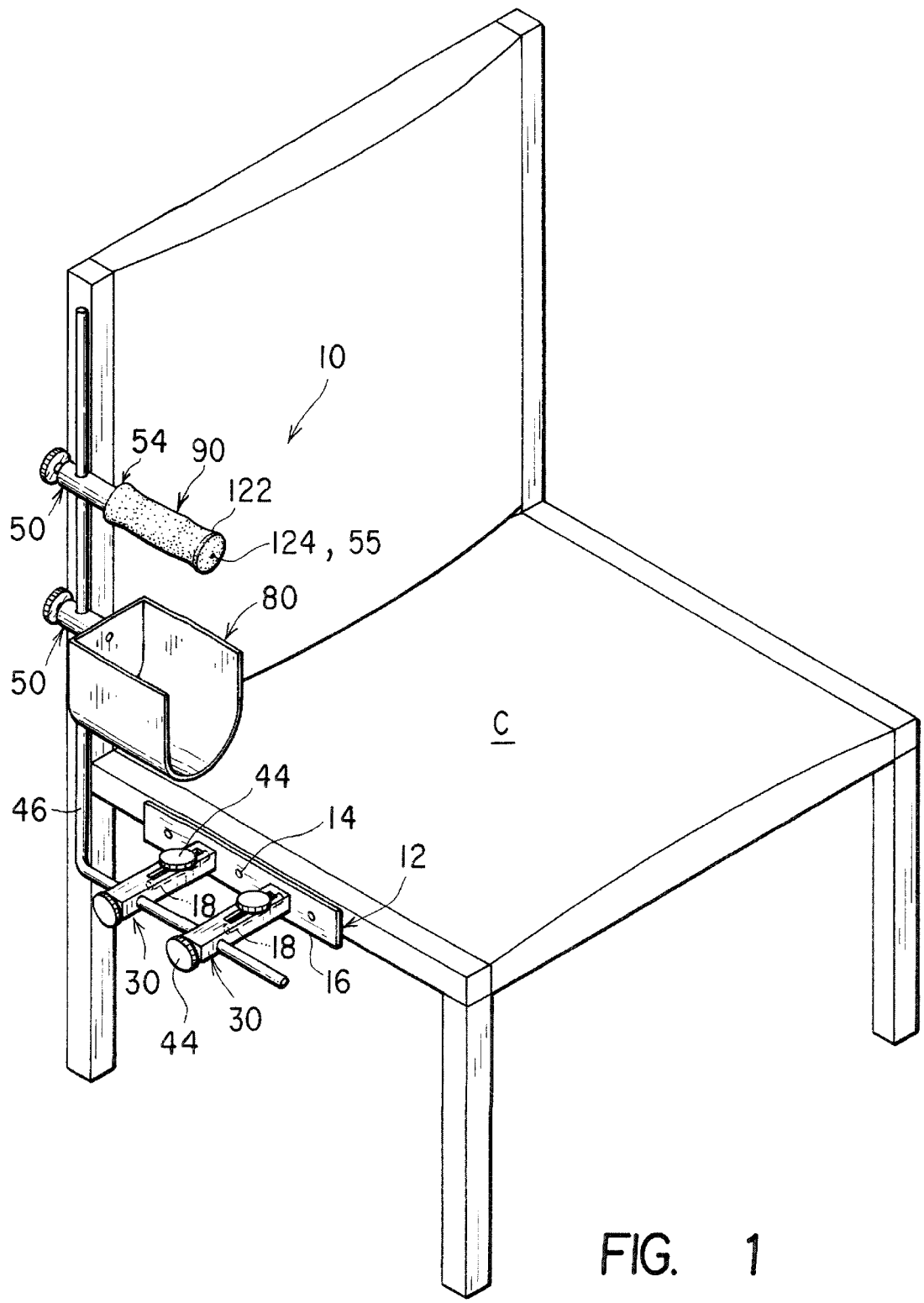
FIG. 1 is an environmental, perspective view of the clamping system having a plurality of different, accessories attached to a support rod attached to a standard chair.

The present invention relates to a clamping system, more particularly, an assemblage of universally interchangeable clamping components and accessories for use with standard healthcare equipment or patient healthcare procedures. Referring first to FIG. 1 and as an initial explanatory note relevant thereto as well as to several other Figures, the clamping system as shown is for purpose of discussion, showing various alternative accessories attached for display or storage only, and not necessarily as each would be used separately in practice. As will be understood from the present description, the clamping system allows combinations and orientations of accessories to depend from a single support structure.

The preferred embodiment of the present clamping system 10 provides a mounting bracket 12 which may be permanently affixed by fasteners 14 to any piece of furniture present in the room of a patient, such as a chair C, bed or wheelchair. By itself, the bracket 12 is minimally noticeable and does not interfere with regular use of the object on which it is mounted.

Figure 9:
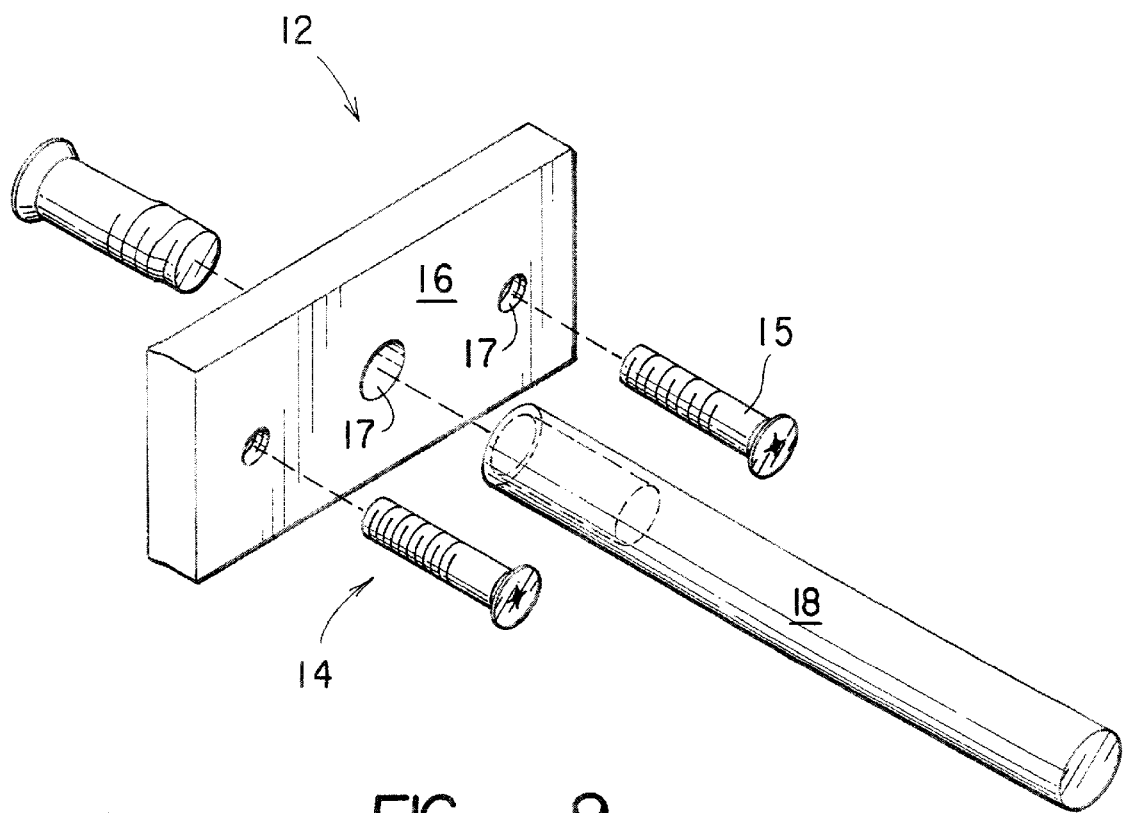
FIG. 9 is a perspective view of a support rod for use with the clamping system.

The mounting bracket 12 has a plate 16 and a post 18 depending perpendicularly from the plate 16 for attachment of a slip-coupling 30 for insertion of the support rod 46, from which all other accessories depend for various uses by a patient. As shown in FIG. 1, the bracket may include two posts 18,18, or as shown in detail in FIG. 9, a single post 18 may be provided. Suitable fasteners 14 may include screws 15 passing through an opening 17 defined in the plate 16 to be secured either to the post 18 or an object, such as chair C. Alternatively, the post 18 may be externally threaded at one end for attachment to an internally threaded aperture in the plate 16 (not shown).

Figure 6:
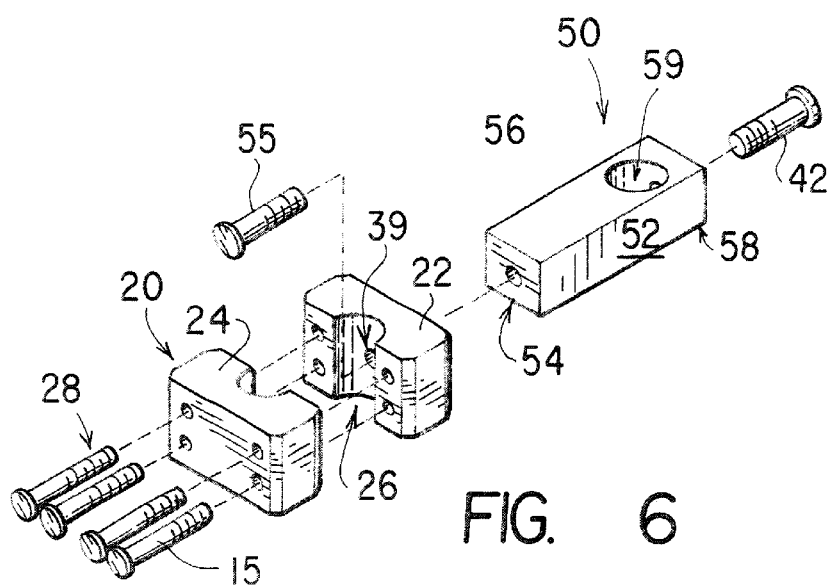
FIG. 6 is a perspective view of a bipartite clamp unit for use on preexisting tubular elements.

An alternative bracket for attachment to a wheelchair or other appliance having cylindrical frame components is also provided, as shown in FIG. 6. A bipartite clamp unit 20 includes a first part 22 and a second part 24, the parts together defining a split, cylindrical passage 26 for surrounding the cylindrical frame component of an appliance. The first part 22 and the second part 24 are coupled together after surrounding the cylindrical frame component by a suitable fastening means 28, which is simply shown as a plurality of screws 15 passing through the second part 24 to engage with threaded bore holes defined in the first part 22. Regardless of the fastening means used, the first part must define a hole 39 so that it may be placed in registry with a threaded bore for receiving a matingly threaded screw 55 of a secondary slip-coupling (described later). The screw 55 passes through the hole 39 into the threaded bore to secure the bipartite clamp unit 20 to the secondary slip-coupling 50. In the alternative, the clamp unit 20 may be attached to a post 18 (not shown).

The post 18 serves as the point of rotation for the slip-coupling 30, as can be appreciated from FIG. 1. The slip-coupling 30 is shown in greater detail in FIG. 5, having a tubular body 32 defining a receiving bore 34 for close passage of the perpendicular post 18 into the first end portion 36. The slip coupling 30 is secured to the post 18 by tightening a set screw 42 against the post 18 to prevent rotational motion of the slip coupling 30. The set screw 42 is removably threaded through the tubular body 32 and attached to an oversized knob head 44 (FIG. 1) for easy manual rotation to tighten and release the set screw 42.

At the opposite end 38 of the tubular body 32, a through bore 40 passes at a right angle to the receiving bore 34. Both the receiving bore 34 and through bore 40 lay in the same plane, thereby allowing the slip coupling 30 to having a trim, streamlined outer appearance. Such outer appearance is preferably cylindrical, which minimizes the difficulty of disinfecting the slip-couplings when manually wiping and cleaning, although tubular body dimensions of a square, rectangular or other uniform geometric cross section may be equally effective. A second set screw 42 is removably threaded through the tubular body 32 and attached to an oversized knob head 44, primarily in order to secure a support rod 46 as shown in FIG. 1.

Figure 8:
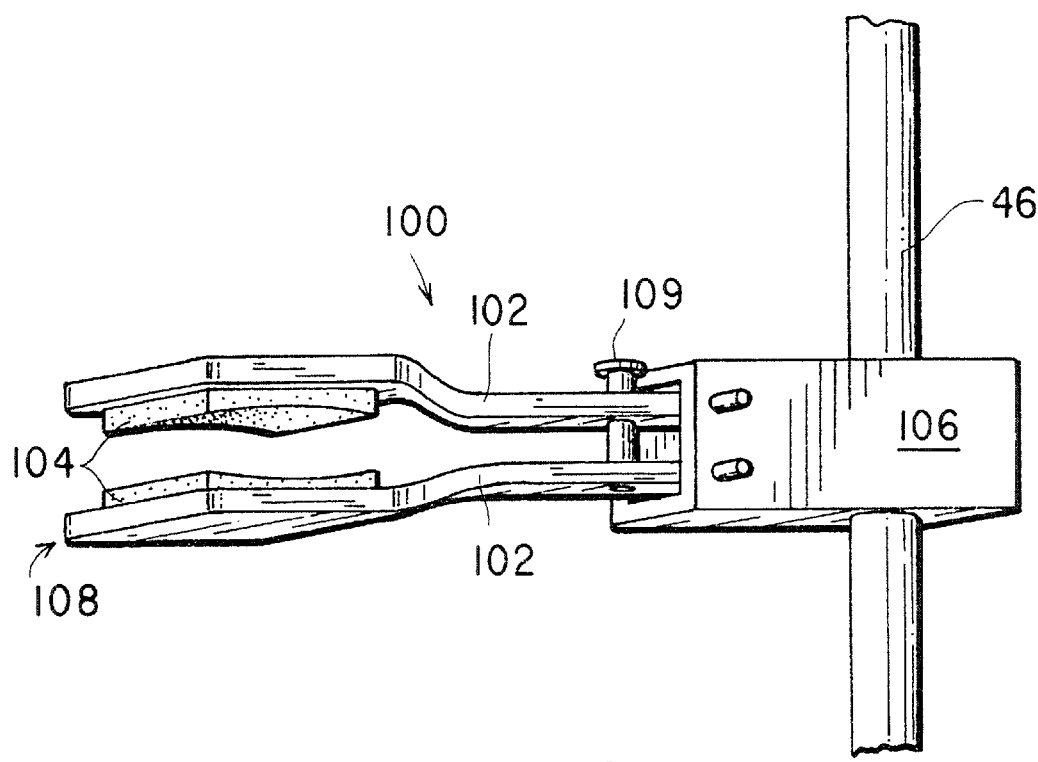
FIG. 8 is a perspective view of a veterinary limb clamp accessory for use with the clamping system.

In use, the support rod 46 passes through the through bore 40 and thereby becomes securely fastened to the chair C. All slip-couplings 30 or secondary slip-couplings 50 are mounted from the support rod 46. The support rod 46 is shown in FIG. 1 as L-shaped so as to vertically orient the rod 46 relative to the appliance to which it is mounted and to allow the secondary slip-couplings 50 to horizontally orient the support accessories which depend therefrom. Such accessories include a removable tray 60 (FIGS. 2A, 2B and 2C), an arm rest 70 (FIG. 3), an elbow rest 80 (FIG. 4), a handle bar 90 (FIG. 1) and veterinary limb clamp 100 (FIG. 8).

Figure 4:
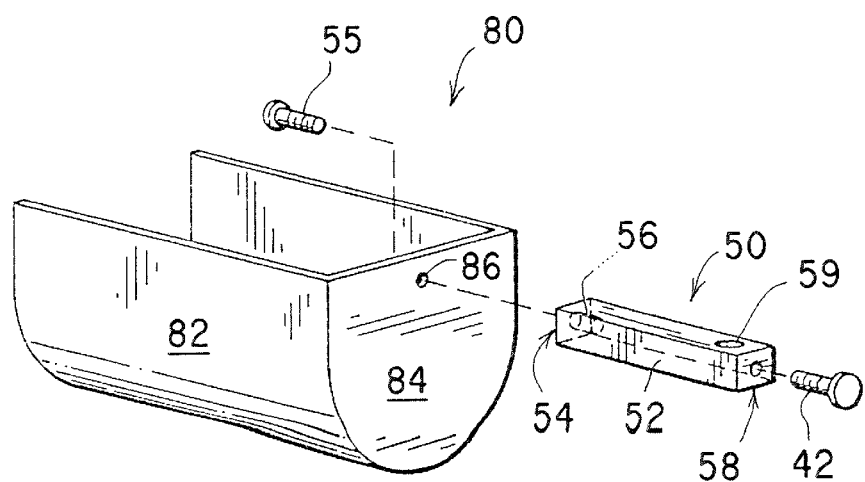
FIG. 4 is a perspective view of an embodiment of an elbow rest accessory for use with the clamping system.

The secondary slip-coupling 50 is essentially like a slip-coupling 30 wherein the receiving bore for the post has been eliminated and, instead, a threaded bore for receiving a mating screw has been substituted. Referring to either FIG. 4 or FIG. 6, the secondary slip coupling 50 is shown exploded as a part of another larger component, such as the elbow rest 80 (FIG. 4). The secondary slip-coupling 50 has a shank 52 having a central longitudinal axis and a uniform cross section defined in a plane transverse to the longitudinal axis. A primary end portion 54 has a planar terminal surface defined by the uniform cross section and further defines a threaded bore 56 for receiving a matingly threaded screw 55. A secondary end portion 58 defines a through passage 59 oriented perpendicularly to the central longitudinal axis which the threaded bore 56 parallels. The through passage 59 is configured to closely receive the support rod 46. To secure the secondary slip-coupling 50 to the support rod 46, the secondary slip-coupling 50 has a set screw 42 passing through the shank 52. The set screw 42 may be provided with an oversized knob head as previously shown with reference to the slip-coupling 30.

The threaded bore 56 is provided to universally receive a standardized mounting means of each accessory, wherein an aperture is provided to allow a screw to be passed therethrough for directly and more permanently attaching the support accessory to the secondary slip-coupling 50. For example in FIG. 4, the elbow rest 80 is a prismatically U-shaped member 82 capped at one end by an end wall 84. The end wall 84 defines an aperture 86 which is brought into registry with the threaded bore 56 of the primary end portion 54 of the secondary slip coupling 50. The screw 55 passes through the aperture 86 and is matingly received by the threaded bore 56.

Figure 3:
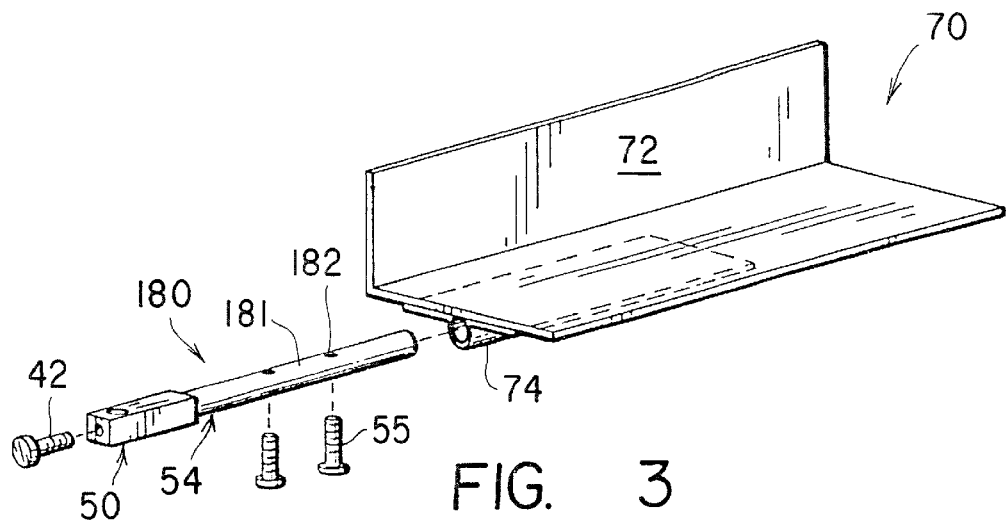
FIG. 3 is a perspective view of an embodiment of an arm rest accessory for use with the clamping system.

In a similar manner adapted from its most simplest form just described, in FIG. 3 an arm rest accessory 70 is shown including a prismatically L-shaped member 72 having a mounting bracket 74 dimensioned and configured to closely receive an arm 180. The arm 180 is a secondary slip-coupling 50 having a cylindrically configured primary end portion, indicated as adapted post 181. Alternatively, the post 18 may serve as adapted post 181, in which the post 18 includes the external thread (not shown) and is received by secondary slip coupling 50. The arm 180, whether combined or unitary, mates with the mounting bracket 74, shown used as part of the arm rest accessory 70. The adapted post 181 is provided with at least one threaded bore 182 for receiving a screw 55 passing through an aperture of the mounting bracket 74.

Figure 2A:
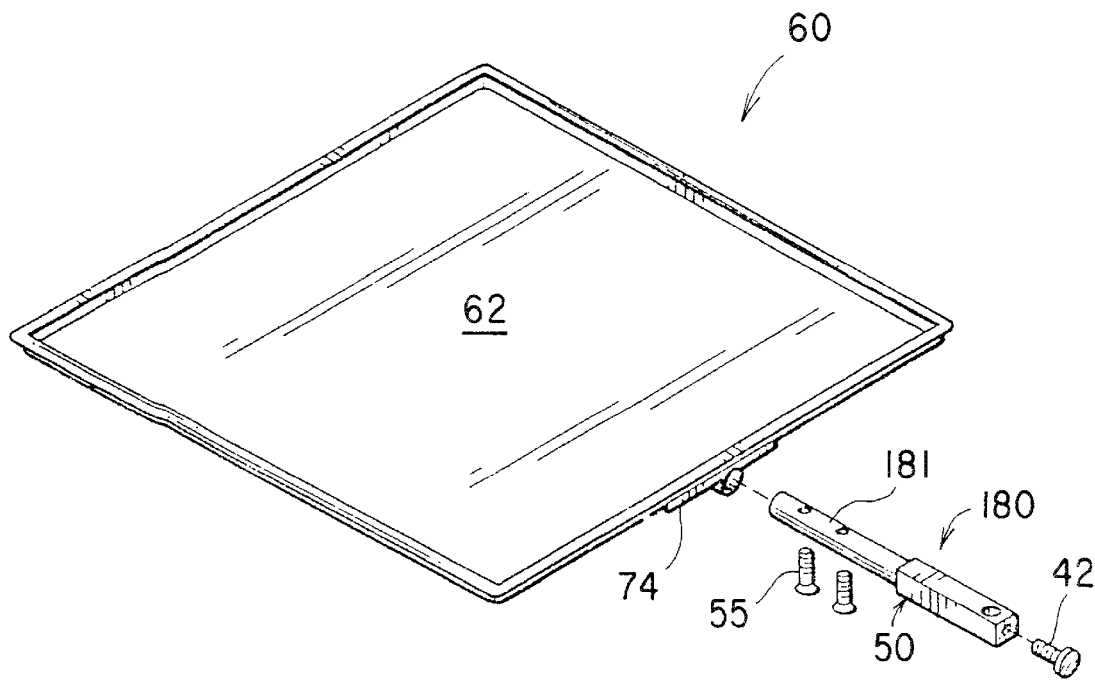
FIG. 2A and FIG. 2B and FIG. 2C are perspective views of a first, a second, and a third embodiment of a tray accessory for use with the clamping system.
Figure 2B:
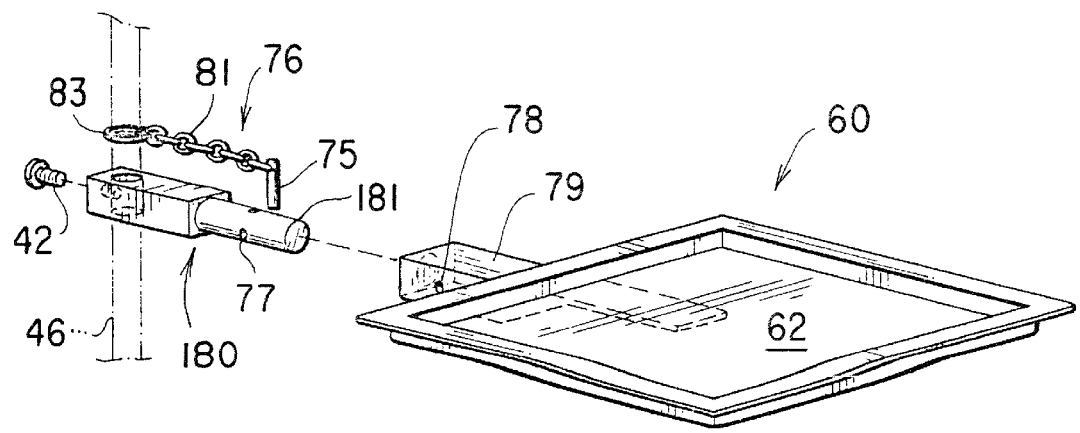
Figure 2C:
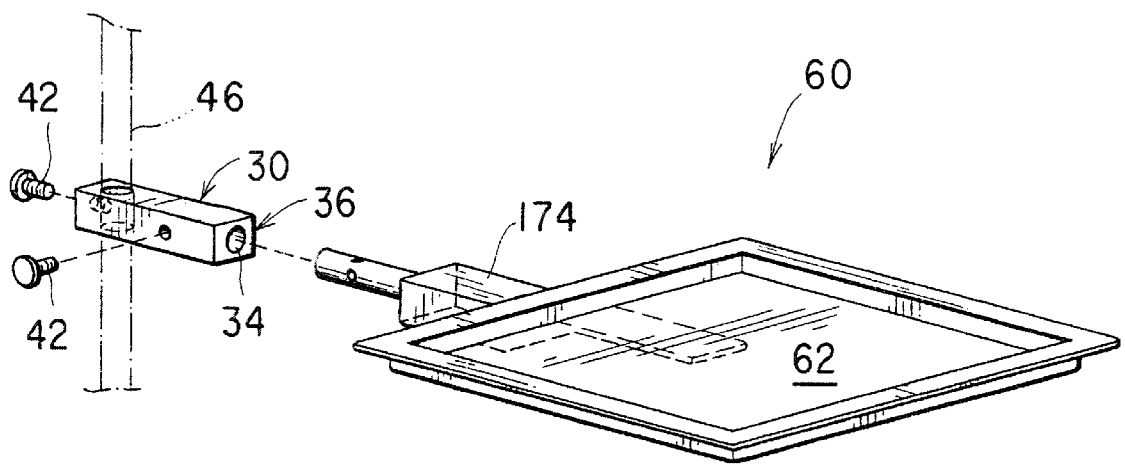

A similar arrangement is shown in FIG. 2A, wherein a tray accessory 60 is provided having a tray 62 with mounting bracket 74 attached to secondary slip coupling 50 combined with adapted post 181 to form arm 180. Screws 55 secure the mounting bracket 74 to the arm 180. The tray accessory 60 may be further varied by featuring a quick-release element. In FIG. 2B, the tray accessory 60 comprises a tray 62 attached to mounting bracket 79 modified in dimension and configuration to define an easily accessible first pin hole 78. The mounting bracket 79 accepts the arm 180 in the previously described manner; however, instead of securing the mounting bracket to the arm with screws, a tether 76 is provided having a wrist pin 75 for removably inserting into both the first pin hole 78 and a second pin hole 77 defined in the adapted post 181. The threaded bore 182 as shown in FIG. 3 for receiving a screw may double as the second pin hole 77. The wrist pin 75 is attached by a tether line 81 having a ring 83 dimensioned to closely pass over the support rod 46. In FIG. 2C, another embodiment of the tray accessory 60 comprises a tray 62 attached to mounting bracket 174 dimensioned and configured to closely pass into the receiving bore 34 of the first end portion 36 of a slip-coupling 30.

Figure 5:
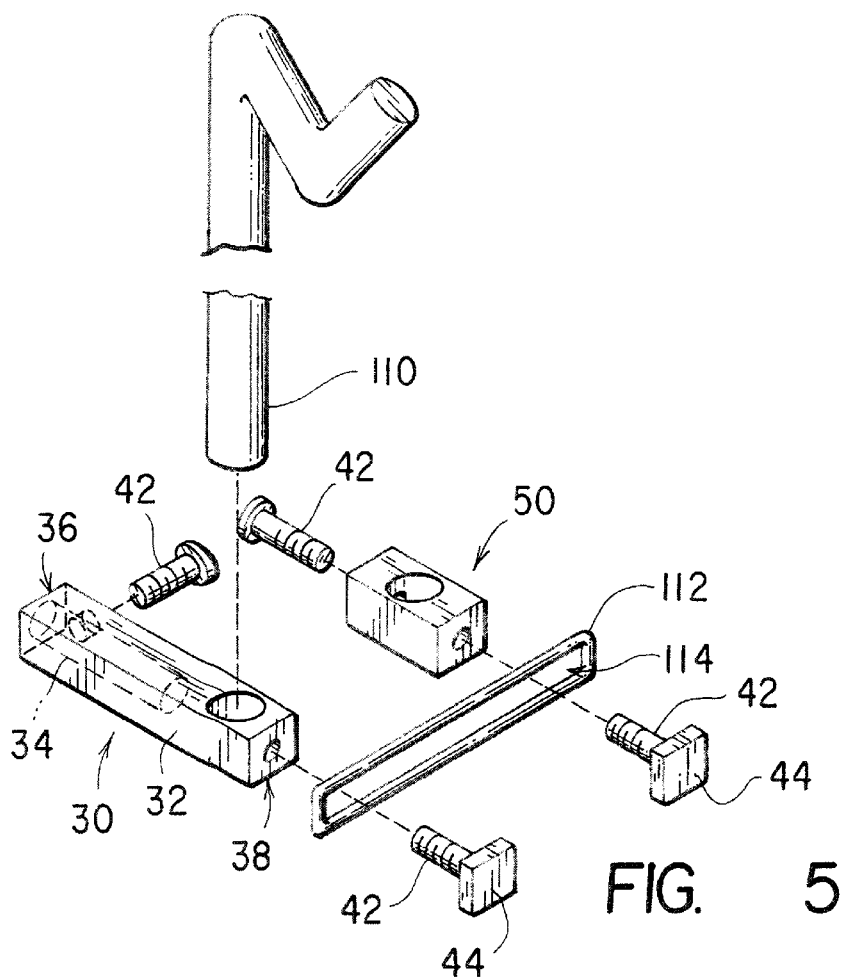
FIG. 5 is a perspective view of an assembly of clamping system parts including an I.V. pole rod and a slip-coupling.

FIG. 5 shows a means for adding vertical support accessories, such as an I.V. pole 110. A bar 112 defines a slot 114 along its length, which slot 114 is provided so that the set screw 42 of a slip-coupling 30 may be passed through the slot 114 at any one of an infinitely variable number of points along the slot. As can be imagined, by tightening the set screw 42, the bar becomes secured between the knob heads 44 and the tubular body 32 of the slip-coupling 30. The bar serves as a horizontal appendage to which a secondary slip-coupling 50 is then attached in the same manner, allowing an I.V. pole 110 and the support rod 46 (not shown) to be passed parallel to one another through a different one of either the through bore of slip-coupling 30 or the through passage of the secondary slip-coupling 50.

The clamping system 10 further includes a handle bar accessory 90 which is an elongated secondary slip-coupling 50 including a handle grip 122 covering the primary end portion 54. An arm 180 having the elongated adapted post 181 may be suitable for such use. The handle grip 122 is manufactured of a material having non-slip and cushioning characteristics, preferably such as neoprene or other foamed rubbers having dense, closed-cell structure. The handle grip 122 includes an aperture 124 through which a screw 55 may be passed to secure the handle grip from movement on the secondary slip-coupling 50.

Referring now to FIG. 8, a limb clamp accessory 100 having means for securing the limb of an animal is shown. The securing means include a pair of spaced gripping arms 102, 102 pivotable on a housing 106, each padded with a cushion 104 at its terminal end 108. The gripping arms 102,102 are adjustably spaced by a spacer screw 109 threaded through both gripping arms 102,102.

Figure 7:
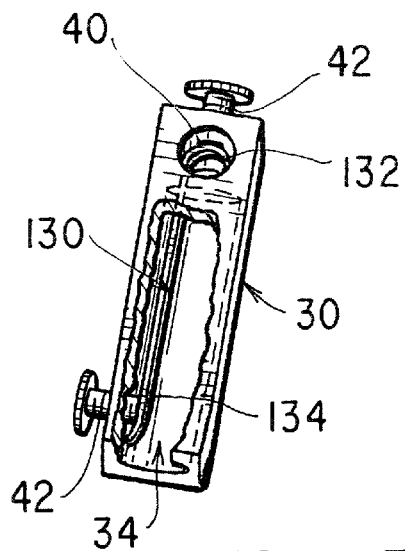
FIG. 7 is a perspective view of a clamp unit having a spring gripping mechanism.

Finally, in certain instances it may be desirable to clamp down upon an irregularly shaped or flattened object as known in the prior art. To adapt the slip-coupling 30 to such an eventuality, a leaf-spring 130, as shown in FIG. 7, is provided to be disposed within said receiving bore 34 of the slip-coupling 30. The leaf-spring is generally J-shaped, having a recurved portion 132 and an elongated flattened portion 134. The flattened portion 134 is sized to reside within the receiving bore 34 (which communicates with the through bore 40) and against the tubular body 32. The recurved portion 132 resides concentrically seated within the through bore 40. The leaf-spring 130 is further positioned to occlude the set screws 42 from the associated bore. Thus, when the slip-coupling having a leaf-spring is passed over the support rod 46, the set screw is tightened against the leaf-spring which in turn exerts force upon the support rod to frictionally prevent slippage of the slip-coupling. Likewise, the set screw 42 of the first end portion 36 exerts force upon the flattened portion 134 and provides added surface area for frictionally engaging an irregular surface.

It is to be understood that the present invention is not limited to the sole embodiments described above, but encompasses any and all embodiments within the scope of the following claims.

I claim:

1. A clamping system comprising:
   a mounting bracket having a plate and at least two posts depending from said plate;
   a support rod; and,
   a slip-coupling having a tubular body having a central longitudinal axis and a uniform cross section defined in a plane transverse to the longitudinal axis, comprising
      a first end portion defining a receiving bore along the central longitudinal axis, said receiving bore configured to closely receive one said post,
      a second end portion defining a through bore oriented perpendicularly to the central longitudinal axis and configured to closely receive said support rod,
      a first releasable lock means for locking said slip-coupling from rotation about said one post; and,
      a second releasable lock means for locking said slip-coupling from sliding along said support rod.

2. The clamping system according to claim 1, further comprising a leaf-spring disposed within said receiving bore.

3. The clamping system according to claim 1, further comprising a limb clamp accessory having means for securing the limb of an animal.

4. The clamping system according to claim 1, further comprising a tray accessory comprising a tray attached to an arm dimensioned and configured to closely pass into the receiving bore of the first end portion of said slip-coupling.

5. The clamping system according to claim 1, further comprising a tray accessory including
   a tray attached to an arm removably and closely passing into said receiving bore of the first end portion of said slip-coupling, said arm defining a first pin hole,
   said first end portion defining a second pin hole in registry with said first pin hole, and
   a wrist pin removably inserted into both said first pin hole and said second pin hole.

6. The clamping system according to claim 5, wherein said wrist pin is attached to a tether having a ring dimensioned to closely pass over said support bar.

7. The clamping system according to claim 1, wherein said first releasable lock means of said slip-coupling is a first set screw threaded through said tubular body and oriented perpendicularly to said receiving bore and having a knob head for manual rotation of said first set screw.

8. The clamping system according to claim 1, wherein said support rod is L-shaped.

9. The clamping system according to claim 1, further comprising a bipartite clamp unit including a first part and a second part together defining a split, cylindrical passage, said first part having a hole in registry with said threaded bore for receiving a matingly threaded screw of said secondary slip-coupling, and a screw passing through said hole and secured to said threaded bore.

10. A clamping system comprising:
    a mounting bracket having a plate and a post depending from said plate;
    a support rod;
    a slip-coupling having a tubular body having a central longitudinal axis and a uniform cross section defined in a plane transverse to the longitudinal axis, comprising
       a first end portion defining a receiving bore along the central longitudinal axis, said receiving bore configured to closely receive said post,
       a second end portion defining a through bore oriented perpendicularly to the central longitudinal axis and configured to closely receive said support rod,
       a first releasable lock means for locking said slip-coupling from rotation about said post, and,
       a second releasable lock means for locking said slip-coupling from sliding along said support rod;
    a secondary slip-coupling including
       a shank, having a central longitudinal axis and a uniform cross section defined in a plane transverse to the longitudinal axis, comprising
          a primary end portion having a planar terminal surface defined by said uniform cross section and defining a threaded bore for receiving a matingly threaded screw,
          a secondary end portion defining a through passage oriented perpendicularly to the central longitudinal axis and configured to closely receive said support rod; and,
    a third releasable lock means for locking said secondary slip-coupling from sliding along said support rod.

11. The clamping system according to claim 10, further comprising an arm rest accessory including
    a prismatically L-shaped member having a mounting bracket dimensioned and configured to closely receive said primary end portion of said secondary slip-coupling and defining an aperture in registry with said threaded bore of said primary end portion, and
    a screw passing through said aperture and matingly received by said threaded bore.

12. The clamping system according to claim 10, further comprising an elbow rest accessory including
    a prismatically U-shaped member having an end wall defining an aperture in registry with said threaded bore of said primary end portion, and
    a screw passing through said aperture and matingly received by said threaded bore.

13. The clamping system according to claim 10, further comprising a handle bar accessory being an elongated secondary slip-coupling including a handle grip covering said primary end portion, said handle grip being manufactured of a material having non-slip and cushioning characteristics.

14. The clamping system according to claim 10,
    wherein further said second releasable lock means of said slip-coupling is a second set screw removably threaded through said tubular body and oriented perpendicularly to said through bore attached to a knob head for manual rotation of said second set screw,
    wherein said third releasable lock means of said secondary slip-coupling is a third set screw removably threaded through said tubular body and oriented perpendicularly to said through passage attached to a knob head for manual rotation of said third set screw, and
    further comprising a bar defining an elongated slot dimensioned to allow passage of both the second set screw and the third set screw and preventing passage of the knob heads,
    whereby the second set screw and the third set screw may be passed through said slot of said bar at any one of an infinitely variable number of points along the slot, and by tightening said set screws, the bar secured between the knob heads and each respective tubular body or shank.

15. The clamping system according to claim 10, further including an I.V. pole configured to closely pass through both said through passage of said secondary slip-coupling and said through bore of said slip-coupling.

16. The clamping system according to claim 10, further comprising a bipartite clamp unit including a first part and a second part together defining a split, cylindrical passage, said first part having a hole in registry with said threaded bore for receiving a matingly threaded screw of said secondary slip-coupling, and a screw passing through said hole and secured to said threaded bore.

17. The clamping system according to claim 10, further comprising a tray accessory comprising a tray having a mounting bracket dimensioned and configured to closely receive said primary end portion of said secondary slip-coupling and defining an aperture in registry with said threaded bore of said primary end portion, and a screw passing through said aperture and matingly received by said threaded bore.

* * * * *